Oct. 28, 1969     G. P. JENNINGS     3,475,004
SEALING MEANS FOR VALVES

Filed Oct. 24, 1966     2 Sheets-Sheet 1

INVENTOR.
G. P. JENNINGS

BY   *Young & Quigg*

ATTORNEYS

3,475,004
Patented Oct. 28, 1969

United States Patent Office 3,475,004
SEALING MEANS FOR VALVES
Gerald P. Jennings, Bartlesville, Okla., assignor to Phillips Petroleum Company, a corporation of Delaware
Filed Oct. 24, 1966, Ser. No. 588,791
Int. Cl. F16k 25/02, 3/20
U.S. Cl. 251—175                                                    1 Claim

ABSTRACT OF THE DISCLOSURE

A plug valve has an endless groove on each side surrounding the plug opening and integral hollow resilient sealing ring in each groove and a screw threaded piston member extending into the valve stem forces pressure fluid from the stem into the sealing rings to provide a tight seal.

---

This invention relates to valves. In still another aspect, this invention relates to sealing means used in valves.

In many uses of valves, it is necessary to effect a completely fluid-tight seal. Some valves utilize a resilient sealing member which is forced into sealing contact by mechanical means or flow line pressure. Valves utilizing flow line pressure sometimes require a fairly high line pressure to ensure an effective seal and mechanically actuated seals are often of expensive manufacture. The expense of the valve is increased by the requirement of close machining tolerances and accurate alignment in assembly. It is desirable to provide a latitude of accommodation in the machining clearance and alignment of valve elements while retaining fluid-tight sealing features in a valve.

Accordingly, it is an object of this invention to effect fluid-tight seals in valves.

Another object of this invention is to provide a fluid-tight valve for use in both high pressure and low pressure flow lines.

Another object of this invention is to provide fluid-tight valves of simplified construction and economical manufacture.

These and other objects will become apparent to one skilled in the art upon consideration of the following specification, the drawings, and the claims.

Figure 4:
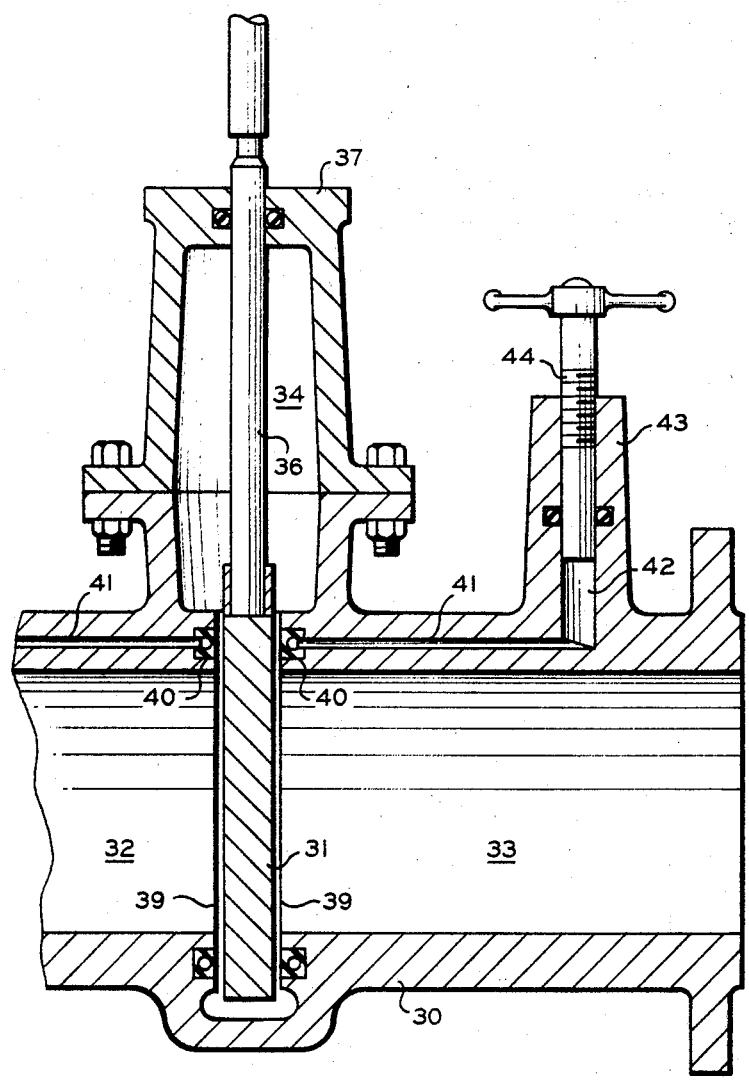

FIGURE 4, a partially broken cross section, depicts the invention as embodied in a gate valve.

According to the invention, the sealing means of a valve contains a hollow resilient sealing ring fitted into an endless groove in the surface of one element of the sealing member, the hollow ring being in fluid communication with an atmosphere-communicating bore; the bore contains a suitable fluid and through this fluid pressure is transmitted to or released from the hollow resilient sealing ring, thus expanding or contracting the sealing ring to form or break sealing contact.

Further in accordance with the invention, the bore contains a piston and the action of the piston in the bore transmits pressure to or releases pressure from the hollow resilient sealing ring.

Further, in accordance with the invention, two or more hydraulically actuated sealing rings are fitted into grooves in the sealing member of a multiport valve so as to seal two or more valve ports against fluid leakage.

Sealing means as used in this application is defined as those valve elements and surfaces which cooperate to form a seal in a valve. For example, in a plug valve, the sealing member comprises the plug itself, the sealing ring, and a valve body surface around a port against which the sealing ring bears. The bore is atmosphere-communicating in the sense that it is not sealed within the valve body but communicates with a suitable pressuring means, at least a portion of which is external to the valve body.

In operation of a valve embodying the invention, the open valve sealing means is moved to its closed position and fluid pressure is applied, as for example, by the piston in the bore, expanding the resilient sealing ring and forcing the ring into contact with a sealing surface, thus effecting a fluid-tight seal. To open the valve, the piston is raised in the bore releasing the fluid pressure and allowing the resilient sealing ring to contract in its groove. The closed sealing element can then be easily moved to its open position.

The endless grooves in the sealing means can be in a stationary element or surface or can be in the moveable element of the sealing means. The groove is shaped to generally conform to and surround the perimeter of a valve port which can be oval, circular, rectangular, or other shape. Any suitable cross sectional configuration can be used for the groove. For example, the groove can be of a semi-circular or rectangular cross section.

The sealing ring is made of a resilient or elastomeric material, such as natural or synthetic rubber, and has a hollow cross section, providing a passageway for the pressurizing fluid. It is preferred to use a resilient material which is durable and of sufficient strength to provide a long useful life when incorporated into the sealing means of a valve. The sealing ring can be molded in one integral piece and shaped to fit snugly into the groove.

Fluid communication between the hollow section of the sealing ring and the bore is necessary. One suitable method of fluid communication is to provide a passageway between the bore and the groove with a press fitted soft metal tubing which extends into the groove. A hole slightly smaller than the outside diameter of the extending tubing can be made in one wall of the resilient seal ring and the ring fitted over the tubing into the groove.

Any suitable means, for example a pump, can be used to pressurize the fluid in the bore. It is preferred to utilize the action of a piston contained in the bore to provide the necessary fluid pressures.

Motive force to the piston in the atmosphere-communicating bore can be provided by any suitable means. One simply constructed means of providing motive force is to insert a threaded plunger into the bore which is also threaded. Exertion or release of pressure on the sealing ring can be effected merely by rotating the plunger. Very large valves can be equipped with a motor and gearing means to actuate the piston. The bore itself can be formed in the valve body, in the sealing means itself, such as in the stem of the plug in a plug valve, or can comprise a cylinder mounted externally of the valve body.

Figure 1:
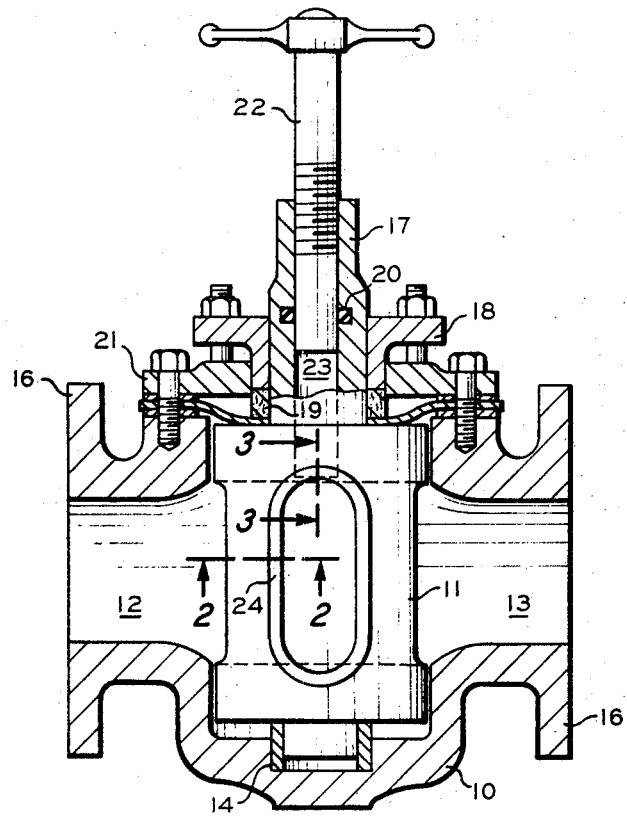
FIGURE 1 is a partially broken view of a plug valve constructed according to this invention.

Referring now to the drawings, wherein like numerals denote like elements, FIGURE 1 depicts a plug valve in open position. A valve body member 10 has a plug member 11 seated in an opening extending transversely to a valve body passageway. A bearing surface 14 supports plug member 11 in the plug member opening. Ports 12 and 13 intersect the plug member opening from opposite sides of valve body 10. Suitable flanges 16 are provided at the outer ends of the ports for joining pipe members in the conventional manner.

An integral hollow atmosphere-communicating stem 17 extends from plug member 11. An atmospheric seal between body member 10 and stem 17 is effected by the thrust of packing gland 18 on packing material 19. Packing gland 18 is held in place by valve top member 21. Plunger 22 is threaded into bore 23 formed in the hollow stem 17, and provides the fluid pressure to hollow sealing ring 24. An O-ring 20 serves as a seal between plunger 22 and the walls of bore 23. A wrench fitted on suitable wrench flats on the shoulder of stem 17 can be used to rotate plug member 11. Because of the expandable sealing ring of this invention, the plug member need not be machined to close tolerance or be lubricated as when there is metal to metal contact.

Figure 2:
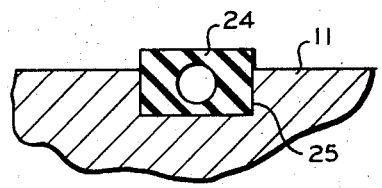
FIGURE 2 is a cross sectional view of one embodiment of the sealing means in the invention.

FIGURE 2 is a cross sectional view along line 2—2 in FIGURE 1. The hollow sealing ring 24, shown as expanded, fits into a groove 25 recessed in the surface of plug member 11.

Figure 3:
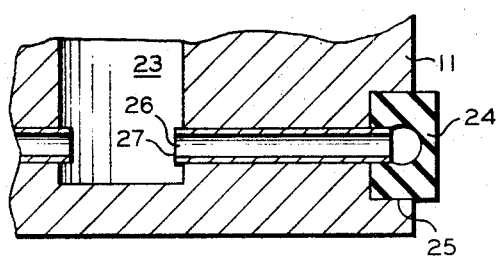
FIGURE 3 is a cross sectional view illustrating the fluid communication between the sealing means and bore of this invention.

FIGURE 3, a cross sectional view of the plug member along line 3—3 illustrates the fluid communication between bore 23 and seal ring 24. A passageway 26 is lined with a press fitted tubing 27 which extends into groove 25 in the surface of plug member 11. A hole in the wall of integral hollow seal ring 24 allows seal ring 24 to fit over extending tubing 27 and into the groove.

As shown in FIGURE 4, the invention can be incorporated into a gate valve. Gate valve body 30 has aligned flow ports 32 and 33 and a body recess 34 serving to accommodate valve gate 31. Gate 31 is connected to operating stem 36 which extends through bonnet 37. Seal rings 40 fit into grooves which are machined or cast in the flat opposed faces 39 of valve body 30. Seal rings 40 are in fluid communication through passageways 41 with bores 42. For simplicity in the drawing, only one of the two bores has been shown. Bore 42 is formed by an integral hollow extension 43 of valve body 30 and is threaded to receive a threaded plunger 44.

The sealing rings for the valves of FIGURE 4 operate in the same manner as the seal rings of the valve illustrated in FIGURE 1. A fluid-tight seal is established against both sides of the gate by the expansion of the sealing rings. FIGURE 1 depicts the invention incorporated in the moveable sealing element while FIGURE 4 shows an embodiment having the sealing rings incorporated in a fixed surface and a bore in the valve body. A bore in the form of an externally mounted cylinder can also be utilized in the practice of the invention. It will be evident from the above description that the invention can be incorporated into a variety of valve constructions and that the fluid-tight sealing means is of such character that it provides accommodation for inaccuracies in machining and valve surface finishing, variations in tolerances and clearances, and slight misalignments which may occur during assembly.

Reasonable variation and modification are within the scope of this invention which sets forth a novel apparatus for effecting fluid-tight seals in valves.

That which is claimed is:

1. A plug valve comprising:
   a valve body member having an inlet port, an outlet port, and a valve body passageway communicating wtih the inlet and outlet ports;
   a plug member rotatably supported in the valve body passageway;
   a valve plug port extending through said plug member;
   a pair of endless grooves recessed in the surface of said plug on opposite sides thereof, each one of said grooves being shaped to conform to and surround one of the inner ends of said valve body passageway when said plug member is rotated into valve closing position;
   a pair of integral hollow resilient sealing rings, each one being fitted into one of said grooves;
   a valve stem operatively connected with said plug member, extending axially therefrom through said valve body member, and terminating exteriorly of said valve body member to permit rotation of said plug member;
   an axially extending cylindrical bore provided in said valve stem and in communication with said endless grooves and said sealing rings in said grooves, said bore being provided with screw threads adjacent the exterior end thereof;
   a pressure fluid contained in said bore;
   a piston member extending into said bore having screw threads thereon mating with said screw threads of said bore and extending exteriorly of said stem, said piston member thus being adapted to cooperate with said bore and apply pressure to said pressure fluid to exert pressure to or release pressure from said sealing rings; and
   sealing means attached to said body member and providing a seal surrounding said stem and permitting rotation thereof.

References Cited
UNITED STATES PATENTS

| | | | |
|---|---|---|---|
| 2,081,842 | 5/1937 | Sharp | 251—173 |
| 2,325,802 | 8/1943 | Schmidt | 251—175 X |
| 2,488,380 | 11/1949 | Danks | 251—173 |
| 2,567,032 | 9/1951 | Schmidt | 251—175 X |
| 2,705,016 | 3/1955 | Saar | 251—173 X |
| 3,353,783 | 11/1967 | Bolling | 251—175 X |
| 2,372,869 | 4/1945 | Wheatley | 251—188 |
| 2,746,712 | 5/1956 | Wickman | 251—161 X |

CLARENCE R. GORDON, Primary Examiner

U.S. Cl. X.R.

251—172, 188, 312, 317